(12) United States Patent
Geithner (10) Patent No.: US 9,075,503 B2
(45) Date of Patent: Jul. 7, 2015

(54) CONCENTRIC HIERARCHICAL LIST BROWSER

(75) Inventor: Ralf Wolfgang Geithner, Schwetzingen (DE)

(73) Assignee: SAP SE, Walldorf (DE)

( * ) Notice: Subject to any disclaimer, the term of this patent is extended or adjusted under 35 U.S.C. 154(b) by 300 days.

(21) Appl. No.: 13/243,918

(22) Filed: Sep. 23, 2011

(65) Prior Publication Data

US 2013/0080975 A1   Mar. 28, 2013

(51) Int. Cl.
G06F 3/0481 (2013.01)
G06F 3/0488 (2013.01)
G06F 3/0482 (2013.01)

(52) U.S. Cl.
CPC .......... *G06F 3/04817* (2013.01); *G06F 3/0488* (2013.01); *G06F 3/0482* (2013.01)

(58) Field of Classification Search
CPC . G06F 3/0482; G06F 3/0481; G06F 3/04812; G06F 3/04842; G06F 3/0362; G06F 3/0488
USPC ......... 715/234, 243, 254, 255, 810, 817, 818, 715/819, 820, 834
See application file for complete search history.

(56) References Cited

U.S. PATENT DOCUMENTS 7,111,788 B2 * 9/2006 Reponen ............... 235/472.01
7,817,168 B2 * 10/2010 Nagiyama et al. ........... 345/661
2008/0059913 A1 * 3/2008 Burtner et al. ............... 715/854
2008/0163112 A1 * 7/2008 Lee et al. ..................... 715/810
2011/0055760 A1 * 3/2011 Drayton et al. .............. 715/834
2011/0105192 A1 * 5/2011 Jung et al. .................... 455/566
2012/0124520 A1 * 5/2012 Samp et al. .................. 715/834

OTHER PUBLICATIONS

"Windows Explorer," Wikipedia, [online], <http://en.wikipedia.org/wiki/Windows_explorer>, retrieved on Sep. 23, 2011, 12 pages.

* cited by examiner

*Primary Examiner* — Kyle Stork
(74) *Attorney, Agent, or Firm* — Fish & Richardson P.C.

(57) ABSTRACT

The present disclosure involves computer-implemented methods, software, and systems for browsing hierarchically structured data using a concentric hierarchical list browser. A computer-implemented method includes displaying, using at least one hardware processor, a first-level circular user interface object with at least one first-level user interface object representing a first-level data object. Responsive to receiving an indication of a selection of the at least one first-level user interface object, decreasing the diameter of the first-level circular interface component, and displaying in a second-level circular user interface object at least one second-level user interface object representing a second-level data object associated with the first-level data object, wherein the second-level circular user interface object has an inner circular edge and an outer circular edge, and wherein the inner circular edge of the second-level circular user interface object is attached to the outer circular edge of the first-level circular user interface object.

20 Claims, 6 Drawing Sheets

CONCENTRIC HIERARCHICAL LIST BROWSER

TECHNICAL FIELD

The present disclosure relates to computer-implemented methods, software, and systems for browsing hierarchically structured data using a concentric hierarchical list browser.

BACKGROUND

Browsing of hierarchically structured data on a computer system is currently realized through the use of tools allowing navigation through nested, hierarchical, tree-like structured lists of data items (e.g., storage repositories, network drives, folders, and/or files). The structure of current browsing tools requires increased vertical and/or horizontal scrolling motions as the number of the data items increase in the hierarchically structured data. Browsing for specific data items using current browsing tools is especially problematic on devices with limited display size, such as smartphones, PDAs, and mobile computers. Increased numbers of scrolling motions are also wasteful of time, repetitive, and cumbersome. Furthermore, the length of tree-like structured lists displayed by browsing tools often exceeds the dimensions of a physical display and, without scrolling, limits a user to a data view limited to the size of the physical display.

SUMMARY

The present disclosure relates to computer-implemented methods, software, and systems for browsing hierarchically structured data using a concentric hierarchical list browser. One computer-implemented method includes displaying, using at least one hardware processor, at least one first-level user interface object representing a first-level data object in a first-level circular user interface object, wherein the first-level circular user interface object has an outer circular edge and is of an initial size. Responsive to receiving an indication of a selection of the at least one first-level user interface object, indicating the selection of the at least one first-level user interface object; decreasing the diameter of the first-level circular interface component, and displaying at least one second-level user interface object representing a second-level data object associated with the first-level data object in a second-level circular user interface object, wherein the second-level circular user interface object has an inner circular edge and an outer circular edge, and wherein the inner circular edge of the second-level circular user interface object is attached to the outer circular edge of the first-level circular user interface object.

While generally described as computer-implemented software embodied on a non-transitory computer readable storage device that processes and transforms respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DESCRIPTION OF DRAWINGS

FIG. 2 is flowchart of an example method for browsing hierarchically structured data using a concentric hierarchical list browser.

DETAILED DESCRIPTION

This disclosure generally describes computer-implemented methods, software, and systems for browsing hierarchically structured data. Specifically described are computer-implemented methods, software, and systems for browsing hierarchically structured data using a concentric hierarchical list browser.

Previously, the browsing of hierarchically structured data objects, (e.g. file systems, categorized/grouped data objects such as music files with classification for music style, publication year, composer, performer, . . . ) was a time-consuming, cumbersome, and repetitive process, especially on devices with limited display size, such as smartphones, PDAs, and mobile computers. The advantages of the present disclosure are numerous. First, browsing tools for hierarchically structured data efficiently present an easily manipulated representation of data objects in the file system within a limited display area. This efficient use of display space optimizes file browsing on devices with limited display area restrictions. Second, repetitive and cumbersome vertical/horizontal scrolling motions are mitigated. Further, data object relationships are presented in a manner that is naturally visually associative. Furthermore, the present disclosure offers numerous advantages for at least hardware devices. For example, the present disclosure describes a method and system allowing a user to efficiently manipulate user interface objects via natural "gestures" (i.e., user/user interface interactions with more than one finger). Gestures may be used to resize data object representations within the concentric hierarchical list browser, turning concentric circles, rings, etc.

Figure 1:
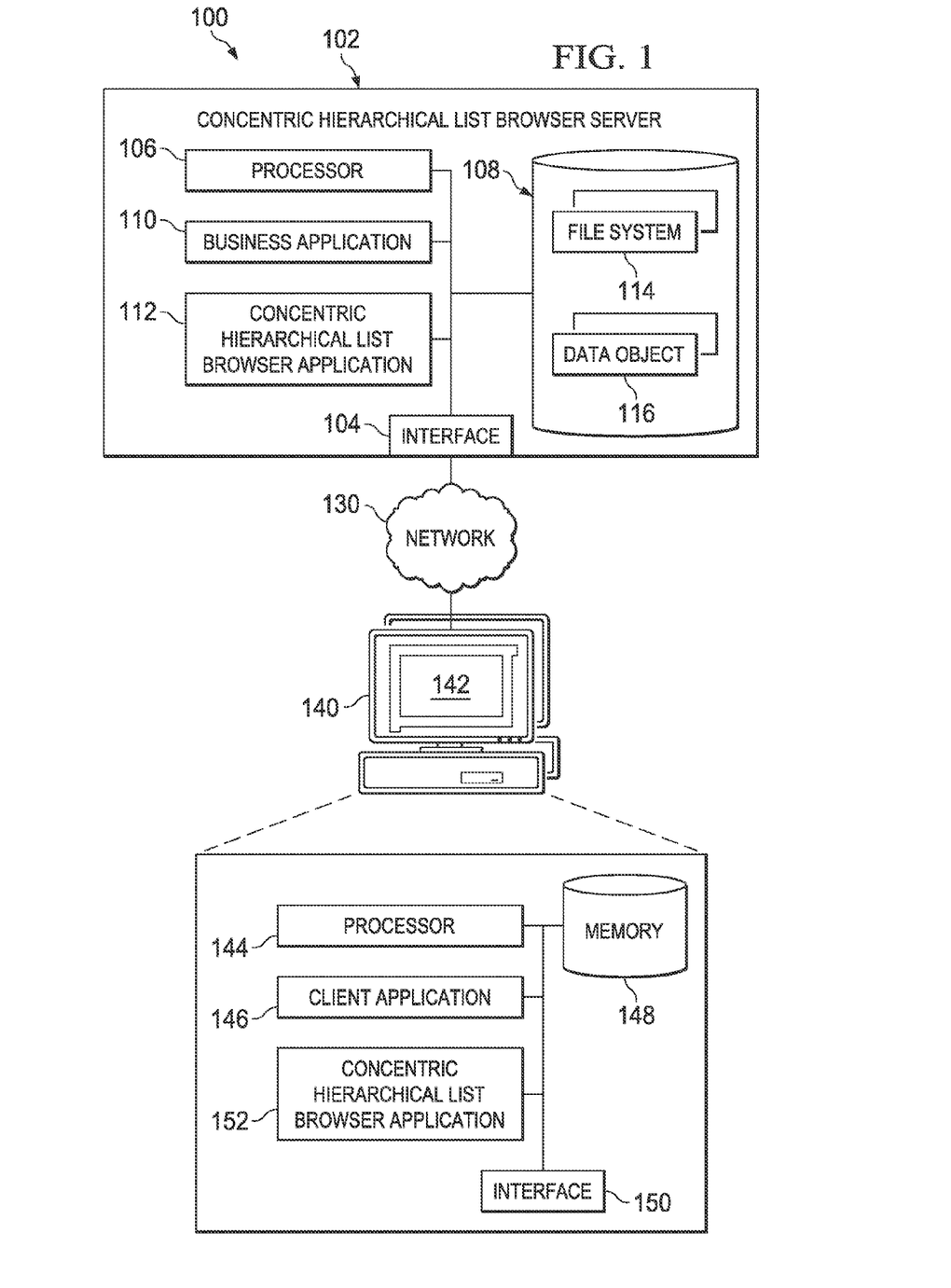
FIG. 1 illustrates an example environment for implementing various features of a system for browsing hierarchically structured data using a concentric hierarchical list browser.

Turning to the figures, FIG. 1 illustrates an example environment 100 for implementing various features of system providing file system browsing in accordance with one implementation of the present disclosure. While the figures are based on the example of an implementation of a concentric hierarchical list browser to visualize hierarchically structured data of a file system, this is for illustrative purposes only and does not limit the general idea to file systems. Generally, the concentric hierarchical list browser can be applied to any type of hierarchically structured data.

The illustrated environment 100 includes, or is communicably coupled with, at least one concentric hierarchical list browser server 102 and at least one client 140. At least one client 140 and the concentric hierarchical list browser server 102 may communicate across or via network 130. In general, example environment 100 depicts an example configuration of a system for providing browsing of hierarchically structured data using a concentric hierarchical list browser. In alternative implementations, the elements illustrated within the concentric hierarchical list browser server 102 and/or the client 140 may be included in or associated with different and/or additional servers, clients, networks, or locations other than those illustrated in FIG. 1. Additionally, the functionality associated with the concentric hierarchical list browser server 102 may be associated with any suitable system, including by adding additional instructions, programs, applications, or other software to existing systems. For example, the components illustrated within the concentric hierarchical list browser server 102 may be included in multiple servers, cloud-based networks, or other locations accessible to the concentric hierarchical list browser server 102 (e.g., either directly or via network 130).

In general, the concentric hierarchical list browser server 102 is any server that provides browsing of a physical or virtual file system using a concentric hierarchical list browser via the concentric hierarchical list browser application 112, where the concentric hierarchical list browser application 112 is associated with at least one file system 114 instance.

For example, each concentric hierarchical list browser server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some implementations, other non-Java based servers and or systems could be used for the concentric hierarchical list browser server 102. In some implementations, each concentric hierarchical list browser server 102 can store and execute a plurality of various other applications (not shown), while in other implementations, each concentric hierarchical list browser server 102 may be a dedicated server meant to store and execute a particular concentric hierarchical list browser application 112 and its related functionality. In some implementations, the concentric hierarchical list browser server 102 can comprise a web server or be communicably coupled with a web server, where the particular concentric hierarchical list browser application 112 associated with that concentric hierarchical list browser server 102 represents a web-based (or web-accessible) application accessed and executed on an associated at least one client 140 to perform the programmed tasks or operations of the corresponding concentric hierarchical list browser application 112, as well as to provide user interactions with a business process. In still other instances, the concentric hierarchical list browser application 112 may be executed on a first system, while the file system and data the concentric hierarchical list browser application 112 manipulates and provides information on may be located at a remote, second system. In the illustrated example, the concentric hierarchical list browser application 112 and the file system are co-located on the concentric hierarchical list browser server 102.

At a high level, the concentric hierarchical list browser server 102 comprises an electronic computing device operable to receive, transmit, process, store, or manage data and information associated with the example environment 100. The concentric hierarchical list browser server 102 illustrated in FIG. 1 can be responsible for receiving application requests from at least one client 140 (as well as any other entity or system interacting with the concentric hierarchical list browser server 102), responding to the received requests by processing said requests in an associated concentric hierarchical list browser application 112, and sending the appropriate responses from the concentric hierarchical list browser application 112 back to the requesting client 140 or other requesting system. The concentric hierarchical list browser application 112 can also process and respond to local requests from a user locally accessing the associated concentric hierarchical list browser server 102. Accordingly, in addition to requests from the external clients 140 illustrated in FIG. 1, requests associated with a particular concentric hierarchical list browser application 112 may also be sent from internal users, external or third-party customers, and other associated business applications, as well as any other appropriate entities, individuals, systems, or computers. In some implementations, the concentric hierarchical list browser application 112 can be a web-based application executing functionality associated with the networked or cloud-based business process.

As used in the present disclosure, the term "computer" is intended to encompass any suitable processing device. For example, although FIG. 1 illustrates a single concentric hierarchical list browser server 102, example environment 100 can be implemented using any number of servers, as well as computers other than servers, including a server pool. Indeed, the concentric hierarchical list browser server 102 may be any computer or processing device such as, for example, a blade server, general-purpose personal computer (PC), Macintosh, workstation, UNIX-based workstation, tablet computer, or any other suitable device. In other words, the present disclosure contemplates computers other than general purpose computers, as well as computers without conventional operating systems. Further, the illustrated concentric hierarchical list browser server 102 may be adapted to execute any physical or virtual operating system, including Linux, UNIX, Windows, Mac OS, WebOS, iOS, Android, or any other suitable operating system.

In the illustrated implementation of FIG. 1, the concentric hierarchical list browser server 102 includes an interface 104, a processor 106, a memory 108, at least one business application 110, and at least one concentric hierarchical list browser application 112. While illustrated as a single component in the example environment 100 of FIG. 1, alternative implementations may illustrate the concentric hierarchical list browser server 102 as comprising multiple parts or portions accordingly.

The interface 104 is used by the concentric hierarchical list browser server 102 to communicate with other systems in a client-server or other distributed environment (including within example environment 100) connected to the network 130 (e.g., an associated client 140, as well as other systems communicably coupled to the network 130). FIG. 1 depicts both a server-client environment, but could also represent a cloud-computing network. Various other implementations of the illustrated example environment 100 can be provided to allow for increased flexibility in the underlying system, including multiple concentric hierarchical list browser servers 102 performing or executing at least one additional or alternative implementations of the concentric hierarchical list browser application 112, as well as other applications associated with or related to the concentric hierarchical list browser application 112. In those implementations, the different concentric hierarchical list browser servers 102 may communicate with each other via a cloud-based network or through the connections provided by network 130. Returning to the illustrated example environment 100, the interface 104 generally comprises logic encoded in software and/or hardware in a suitable combination and operable to communicate with the network 130. More specifically, the interface 104 may comprise software supporting at least one communication protocol associated with communications such that the network 130 or the interface's hardware is operable to communicate physical signals within and outside of the illustrated example environment 100.

Generally, the concentric hierarchical list browser server 102 may be communicably coupled with a network 130 that facilitates wireless or wireline communications between the components of the example environment 100 (i.e., between the concentric hierarchical list browser server 102 and at least one client 140), as well as with any other local or remote computer, such as additional clients, servers, or other devices communicably coupled to network 130, including those not illustrated in FIG. 1. In the illustrated example environment 100, the network 130 is depicted as a single network, but may be comprised of more than one network without departing from the scope of this disclosure, so long as at least a portion of the network 130 may facilitate communications between senders and recipients. In some implementations, at least one component associated with the concentric hierarchical list browser server 102 can be included within the network 130 as at least one cloud-based service or operation. The network 130 may be all or a portion of an enterprise or secured network, while in another implementation, at least a portion of the network 130 may represent a connection to the Internet. In some implementations, a portion of the network 130 can be a virtual private network (VPN). Further, all or a portion of the network 130 can comprise either a wireline or wireless link. Example wireless links may include cellular, 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated example environment 100. The network 130 may communicate, for example, Internet Protocol (IP) packets, Frame Relay frames, Asynchronous Transfer Mode (ATM) cells, voice, video, data, and other suitable information between network addresses. The network 130 may also include at least one local area network (LAN), radio access network (RAN), metropolitan area network (MAN), wide area network (WAN), all or a portion of the Internet, and/or any other communication system or systems in at least one location. The network 130, however, is not a required component in some implementations of the present disclosure.

As illustrated in FIG. 1, the concentric hierarchical list browser server 102 includes a processor 106. Although illustrated as a single processor 106 in the business process server 102, two or more processors may be used in the concentric hierarchical list browser server 102 according to particular needs, desires, or particular implementations of example environment 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the concentric hierarchical list browser server 102 and, specifically, the functionality associated with the corresponding concentric hierarchical list browser application 112. In one implementation, the concentric hierarchical list browser server 102 processor 106 executes the functionality required to receive and respond to requests and instructions from the at least one client 140, as well as the functionality required to perform the operations of the associated business application 110 and concentric hierarchical list browser application 112.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, C#, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated example environment 100, each processor 106 executes the concentric hierarchical list browser application 112 stored on the associated concentric hierarchical list browser server 102. In some implementations, a particular concentric hierarchical list browser server 102 can be associated with the execution of two or more concentric hierarchical list browser applications 112, as well as at least one distributed application executing across two or more concentric hierarchical list browser servers 102.

At least one business application 110 is illustrated within the concentric hierarchical list browser server 102. The business application 110 can be any application, program, module, process, or other software that may execute, change, delete, generate, or otherwise manage information associated with a particular concentric hierarchical list browser server 102, and in some cases, a business process performing and executing business process-related events. In particular, business processes communicate with other users, applications, systems, and components to send and receive events. In some implementations, a particular business application 110 can operate in response to and in connection with at least one request received from an associated client 140. Additionally, a particular business application 110 may operate in response to and in connection with at least one request received from other business applications 110, including a business application 110 associated with another concentric hierarchical list browser server 102. In some implementations, each business application 110 can represent a web-based application accessed and executed by remote clients 130 via the network 130 (e.g., through the Internet, or via at least one cloud-based service associated with the concentric hierarchical list browser application 112). For example, a portion of a particular business application 110 may be a web service associated with the business application 110 that is remotely called, while another portion of the business application 110 may be an interface object or agent bundled for processing at a remote client 140. Moreover, any or all of a particular business application 110 may be a child or sub-module of another software module or enterprise application (not illustrated) without departing from the scope of this disclosure. Still further, portions of the particular business application 110 may be executed or accessed by a user working directly at the concentric hierarchical list browser server 102, as well as remotely at a corresponding client 140. In some implementations, the concentric hierarchical list browser server 102 can execute the business process models using the at least one business application 110.

At least one concentric hierarchical list browser application 112 is illustrated within the concentric hierarchical list browser server 102. Each concentric hierarchical list browser application 112 is any application, program, module, process, or other suitable software that may execute, change, delete, generate, or otherwise manage information associated with a particular concentric hierarchical list browser server 102, and in some cases, a business process performing and executing business process-related events. For purposes of this application, "circular" may mean generally round in shape and may include circles, rings, spheres, ovals, etc.

The concentric hierarchical list browser application 112 may display the file system's hierarchy and/or content of the file system hierarchy via a circular file browser user interface. The circular file browser user interface may have multiple associated concentric levels which may be nested. Each concentric level may display data objects associated with the particular level in the file system. In some implementations, deeper levels of the file system are displayed in the outer layers of the circular file browser user interface. In some implementations, the circular file browser user interface may display in two or more dimensions. In some implementations, a particular concentric hierarchical list browser application 112 can operate in response to and in connection with at least one request received from an associated client 140. In some implementations, a particular concentric hierarchical list browser application 112 can operate in response to and in connection with at least one request received from at least one business application 110. Additionally, a particular concentric hierarchical list browser application 112 may operate in response to and in connection with at least one request received from other concentric hierarchical list browser applications 112, including a concentric hierarchical list browser application 112 associated with another concentric hierarchical list browser server 102. Each concentric hierarchical list browser application 112 may be on the same system as the business application 110 or on a different, communicably coupled system. In some implementations, a concentric hierarchical list browser application 112 can be included or embedded within a particular business application 110, or, alternatively, a portion of the particular business application's inherent functionality. In some instances, at least a portion of the concentric hierarchical list browser application's 112 functionality can also be included within the operating system of the concentric hierarchical list browser server 102, such as a system explorer or other directory browsing/access tool. In some implementations, each concentric hierarchical list browser application 112 can represent a web-based application accessed and executed by remote clients 130 via the network 130 (e.g., through the Internet, or via at least one cloud-based service associated with the concentric hierarchical list browser application 112). In some implementations, the concentric hierarchical list browser application 112 can manage the display and/or operation of a concentric file browser user interface associated with the concentric hierarchical list browser server 102, an associated client 140, and/or another concentric hierarchical list browser server 102. Further, while illustrated as internal to the concentric hierarchical list browser server 102, at least one file system 114 and/or data object 116 associated with a particular concentric hierarchical list browser application 112 may be stored or referenced remotely. For example, a portion of a particular concentric hierarchical list browser application 112 may be a web service associated with the concentric hierarchical list browser application 112 that is remotely called, while another portion of the concentric hierarchical list browser application 112 may be an interface object or agent bundled for processing at a remote client 140. Moreover, any or all of a particular concentric hierarchical list browser application 112 may be a child or sub-module of another software module or enterprise application (not illustrated) without departing from the scope of this disclosure. Still further, portions of the particular concentric hierarchical list browser application 112 may be executed or accessed by a user working directly at the concentric hierarchical list browser server 102, as well as remotely at a corresponding client 140. In some implementations, the concentric hierarchical list browser server 102 can allow browsing of a local and/or remote file system and/or associated data objects 116 using the at least one concentric hierarchical list browser application 112.

The concentric hierarchical list browser server 102 also includes a memory 108 for storing data and program instructions. The memory 108 may include any memory or database module and may take the form of volatile or non-volatile memory including, without limitation, magnetic media, optical media, random access memory (RAM), read-only memory (ROM), flash memory, removable media, or any other suitable local or remote memory component. The memory 108 may store various objects or data, including classes, frameworks, applications, backup data, business objects, jobs, web pages, web page templates, database tables, process contexts, repositories storing services local to the concentric hierarchical list browser server 102, and any other appropriate information including any parameters, variables, algorithms, instructions, rules, constraints, or references thereto associated with the purposes of the concentric hierarchical list browser server 102 and its concentric hierarchical list browser application 112. In some implementations, including a cloud-based system, some or all of the memory 108 can be stored remote from the concentric hierarchical list browser server 102, and communicably coupled to the concentric hierarchical list browser server 102 for usage. As illustrated in FIG. 1, memory 108 includes at least one file system 114 and at least one data object 116.

The at least one file system 114 may represent a physical or virtual file system and may be a disk, optical, flash, tape, database, transactional, network, shared-disk, device specific, FAT, NTFS, HFS Plus, UFS, Ext, Flat-file, or another suitable file system. The at least one file system 114 may execute under any physical or virtual operating system, including Linux, UNIX, Solaris, Windows, Mac OS, WebOS, iOS, Android, or any other suitable operating system. In some implementations, the file system can be hierarchical and/or weighted. In some implementations, the file system can be remote to the concentric hierarchical list browser server 102. The file system may be accessed via a web service, a remote access system or software, a local or remote client 140, etc.

The at least one data object 116 may be a file, file name, pointer, reference, directory/folder, drive, network drive, metadata, business object, image, video, audio, multimedia, a placeholder, or any other suitable data object. The at least one data object could also be an attribute of a data object in computer memory. For example, the attribute could be information encapsulated in a music file such as composer, publication year, music style, artist, or the like. The at least one data object may reside on or be referenced by an above-mentioned at least one file system 114 or other suitable file system. The data object may reside locally and/or remotely to the at least one file system 114.

In general, a client 140 is any computer device operable to connect or communicate with concentric hierarchical list browser server 102 using a wireless or wireline connection (i.e., network 130). In particular, the client 140 may be embodied as a mobile or non-mobile computing device. At a high level, each client 140 can include a processor 144, a GUI 142, a client application 146, a memory 148, an interface 150, and a concentric hierarchical list browser application 152. In general, the client 140 comprises an electronic computer device operable to receive, transmit, process, and/or store any appropriate data associated with a concentric hierarchical list browser server 102 or other suitable data source.

The interface 150 of the client 140 may be similar to the interface 104 of the concentric hierarchical list browser server 102, in that it may comprise logic encoded in software and/or hardware in a suitable combination and operable to communicate with the network 130. More specifically, interface 140 may comprise software supporting at least one communication protocol such that the network 130 or hardware is operable to communicate physical signals to and from the client 140. Further, although illustrated as a single interface 140, the interface 140 may be implemented as multiple interfaces in the client 140.

Similarly, memory 148 of the client 140 may include any memory or database module and may take the form of volatile or non-volatile memory including, without limitation, magnetic media, optical media, random access memory (RAM), read-only memory (ROM), removable media, or any other suitable local or remote memory component. For example, memory 148 may store a client application 146, a concentric hierarchical list browser application 152, backup data, parameters, cookies, variables, algorithms, instruction, rules, or reference thereto. As illustrated, memory 148 can include any suitable components to interpret and decode messages received at the client 140. Further, although illustrated as a single memory 148, the memory 148 may be implemented as multiple memories in the client 140. The memory 148 may also store at least one file system (not shown) and an at least one data object (not shown) similar to the at least one file system 114 and the at least one data object 116, respectively stored in memory 108.

In some implementations, processor 144 can be similar to processor 106. In other implementations, the processor 144 may be a processor designed specifically for use in client 140. Further, although illustrated as a single processor 144, the processor 144 may be implemented as multiple processors in the client 140. Regardless of the type and number, the processor 1e4 executes instructions and manipulates data to perform the operations of the client 140, including operations to receive and process information from the concentric hierarchical list browser server 102 or other suitable data source, access data within memory 148, execute the client application 146, execute the concentric hierarchical list browser 152, as well as perform other operations associated with the client 140.

The client application 146 of the client 140 may retrieve application-related information from a corresponding concentric hierarchical list browser server 102, or the client application may access a local cached set of client-application-related information (not shown) stored on the client 140. In some implementations, the client application 146 can be a web browser. In some implementations, the client-application 146 can use parameters, metadata, and other information received at launch to access a particular set of data from the concentric hierarchical list browser server 102. Once a particular client application 146 is launched, a user may interactively process a task, event, or other information associated with the concentric hierarchical list browser server 102. Further, although illustrated as a single client application 146, the client application 146 may be implemented as multiple client applications in the client 140.

The concentric hierarchical list browser application 152 of the client 140 may be similar to concentric hierarchical list browser application 112 as described above. In some implementations, the concentric hierarchical list browser application 152 can manage the display and operation of a concentric file browser user interface associated with the client 140, another client 140, or an associated concentric hierarchical list browser server 102. In some implementations, the concentric hierarchical list browser application 152 can allow browsing of a local and/or remote file system and/or associated data objects 116. In some implementations, the concentric hierarchical list browser application 152 can manage the display and/or operation of a concentric file browser user interface associated with the client 104, another client 140, and/or an associated concentric hierarchical list browser server 102. The concentric hierarchical list browser application 152 may display the file system's hierarchy and/or content of the file system hierarchy via the concentric file browser user interface. Each concentric level may display data objects associated with the particular level in the file system. In some implementations, deeper levels of the file system can be displayed in the outer layers of the concentric file browser user interface. In some implementations, a concentric hierarchical list browser application 152 can be included or embedded within a particular client application 146, or, alternatively, a portion of the particular client application's inherent functionality. In some instances, at least a portion of the concentric hierarchical list browser application's 146 functionality can also be included within the operating system of the client 140, such as a system explorer or other directory browsing/access tool.

The GUI 142 of the client 140 is a graphical user interface operable to allow the user of the client 140 to interface with at least a portion of the system 100 for any suitable purpose, including to allow a user of the client 140 to interact with at least one of the client applications 146, at least one concentric hierarchical list browser application 152, and with the concentric hierarchical list browser server 102. The term "Graphical User Interface", or GUI, may be used in the singular or plural to describe at least one graphical user interface and each of the displays of a particular graphical user interface. Therefore, the GUI 142 can be any graphical user interface, such as a generic web browser, touch screen, or command line interface (CLI) that processes information in the system 100 and efficiently presents the results to a user. Generally the GUI 142 provides the client 140 with an efficient and user-friendly presentation of data provided by or communication within the system 100. In particular, the GUI 142 may provide users of the client 140 with visualized representation of the client application 146, concentric filed system browser application 152, and other client 140 functionality. The GUI 142 may include a plurality of user interface elements such as interactive fields, pull-down lists, buttons, and other suitable user interface elements operable at the client 140.

While FIG. 1 is described as containing or being associated with a plurality of components, not all components illustrated within the illustrated implementation of FIG. 1 may be utilized in each implementation of the present disclosure. Additionally, at least one component described herein may be located external to example environment 100, while in other implementations, certain components may be included within or as a portion of at least one described component, as well as other components not described. Further, certain components illustrated in FIG. 1 may be combined with other components, as well as used for alternative or additional purposes, in addition to those purposes described herein.

FIG. 2 illustrates a flowchart of an example method 200 for browsing hierarchically structured data using a concentric hierarchical list browser. For clarity of presentation, the description that follows generally describes method 200 in the context of example environment 100 illustrated in FIG. 1, FIGS. 3A-3C, and FIG. 4 However, it will be understood that method 200 may be performed, for example, by any other suitable system, environment, or combination of systems and environments, as appropriate.

Referring now to FIG. 2, method 200 begins at 202. At 202, a first-level circular user interface object with a first-level user interface object is displayed. In some implementations, the first-level circular user interface object can be divided into at least one region where associated first-level user interface objects are displayed. In some implementations, the first-level user interface object represents a first-level business object. In some implementations, a first-level user interface object can represent two or more first-level business objects. In some implementations, the first-level user interface object can be a selectable button, label, badge, image, regular or irregularly shaped area, or other suitable user interface object. In some implementations, the first-level user interface object can be a selectable, graphical representation of the first-level data object. The first-level data object may be a file, file name, pointer, reference, directory/folder, drive, network drive, metadata, image, video, audio, multimedia, business object, a placeholder, or any other suitable data object. The first-level circular user interface object may be used to act as a starting point for displaying/browsing any level of hierarchically structured data. The first-level circular user interface object and the first-level user interface object may be displayed differently to indicate their difference, relative importance, relative size of their particular contents, order of access, date of creation, date of modification, security access level necessary to access, relative value, or any other suitable distinguishing characteristic, value and/or attribute. Displaying differently may mean, for example, different colors, sizes, shapes, or any other suitable indicator. From 202, method 200 proceeds to 204.

At 204, a determination is made whether an indication of a selection of a first-level user interface object was received. Selecting may be performed using, for example, a computer mouse, keyboard, stylus, touch screen, an algorithm, voice recognition or other suitable selection method and/or tool. If the first-level user interface object is not determined to be selected (i.e., after a predetermined period of time), method 200 may stay at 204 until a selection is made. In some instances, if no selection is determined, method 200 can return to some other point in the method 200. Responsive to a determination that an indication of a selection of a first-level user interface object was received, method 200 proceeds to 206. At 206, the selection of the first-level user interface object is indicated. In some implementations, the indication can be made through sound, color, text, animation, or other suitable indication. In some implementations, the indication can be persistent. In other implementations, the indication may not be persistent. In some implementations, the selected first-level circular user interface object can rotate automatically to orient the selected first-level user interface object into a predefined orientation. The predefined orientation may be any distinct position on a circular angle. In some implementations, all selected objects are aligned on the same circular angle. From 206, method 200 proceeds to 208.

At 208, the first-level circular user interface object rotates automatically to orient the selected first-level user interface object into a predefined position as described above. In some implementations, rotation can be clockwise, counterclockwise, or instantaneous. In some implementations, any labels associated with the selected first-level user interface object and other associated first-level user interface objects can rotate automatically to remain in an orientation conducive to viewing and reading. From 208, method 200 proceeds to 210.

At 210, a diameter of a first-level circular user interface object is decreased. In some implementations, associated first-level user interface objects can also be decreased in size to fit within the deceased diameter of the first-level circular user interface object. In some implementations, the decrease in size of the associated first-level user interface objects can be proportional to the decrease in size of the diameter of the first-level circular user interface object. In some implementations, illustrated separation of first-level user interface objects, labels, indicators, badges, etc. can be compressed or removed to fit within available space within the decreased diameter first-level circular user interface object. From 210, method 200 proceeds to 212.

At 212, a second-level circular user interface object with a second-level user interface object representing a second-level data object associated with a first-level data object is displayed. In some implementations, the second-level circular user interface object can be divided into at least one region where associated second-level user interface objects are displayed. In some implementations, a second-level user interface object can represent two or more second-level business objects. In some implementations, the second-level circular user interface object can have an inner circular edge and an outer circular edge. In some implementations, at least one second-level data object can be displayed within the area formed by the inner circular edge and the outer circular edge of the second-level circular user interface object. In some implementations, the inner circular edge of the second-level circular user interface object can be attached to an outer edge of the first-level circular user interface object. In some implementations, the collective diameter of the first-level circular user interface object and the second-level circular user interface object can correspond to what was previously the diameter of the first-level circular user interface object. In some implementations, if no second-level data objects are associated with a selected first-level data object, the second-level circular user interface object and associated second-level user interface object is not displayed. In this case, an indication may be made to the user that there are no second-level data objects associated with the selected first-level data object. The indication may be, for example, sound, color, text, animation, or another suitable indicator. A prompt to open or access the first-level data object, if applicable, may be generated. In other implementations, the second-level circular user interface object may be displayed in an empty and non-selectable state. In some implementations, selecting another first-level user interface object can reset the selection indication of the first-level user interface object and/or display a new second-level circular user interface object associated with the selected another first-level user interface object. The second-level circular user interface object and the second-level user interface object may be displayed differently to indicate their difference, relative importance, relative size of their particular contents, order of access, date of creation, date of modification, security access level necessary to access, relative value, or any other suitable distinguishing characteristic, value and/or attribute. Displaying differently may mean, for example, different colors, sizes, shapes, or any other suitable indicator. From 212, method 200 proceeds to 214.

At 214, a determination is made whether an indication of a selection of a second-level user interface object was received. Selecting may be performed as described above with regard to selecting a first-level user interface object. If the second-level user interface object is not determined to be selected (i.e., after a predetermined period of time), method 200 may stay at 214 until a selection is made. In some instances, if no selection is determined, method 200 may proceed to some other point in the process flow. Responsive to a determination that an indication of a selection of a first-level user interface object was received, method 200 proceeds to 216. At 216, the selection of the second-level user interface object is indicated. Indication may be made as described above with regard to the selection indication of the first-level user interface object. In some implementations, the indication can be persistent. In other implementations, the indication may not be persistent. In some implementations, selecting another first-level user interface object can reset the selection indication of the selected second-level user interface object and indicate the selection of another second-level user interface object associated with the another first-level user interface object. In some implementations, the selected second-level circular user interface object can rotate automatically to orient the selected second-level user interface object into a predefined orientation. The predefined orientation may be any distinct position on a circular angle. In some implementations, all selected objects are aligned on the same circular angle. In some implementations, the rotation of the second-level circular user interface object can also automatically rotate the first-level circular user interface object. From 216, method 200 proceeds to 218.

At 218, the second-level circular user interface object rotates automatically to orient the selected second-level user interface object into a predefined position as described above. In some implementations, rotation can be clockwise, counterclockwise, or instantaneous. In some implementations, any labels associated with the selected second-level user interface object and other associated second-level user interface objects can rotate automatically to remain in an orientation conducive to viewing and reading. In some implementations, the selected second-level user interface object is aligned on the same circular angle with an associated selected first-level user interface object. From 218, method 200 proceeds to 220.

At 220, a collective diameter of a first-level circular user interface object and a second-level circular user interface object is decreased. In some implementations, associated first-level user interface objects and second-level user interface objects can also decreased in size to fit within the collective deceased diameter of the first-level circular user interface object and the second-level circular user interface object. In some implementations, the decrease in size of the associated first-level user interface objects and second-level user interface objects can be proportional to the decrease in size of the collective diameter of the first-level circular user interface object and the second-level circular user interface object. In some implementations, illustrated separation of first-level user interface objects and second-level user interface objects along with associated labels, indicators, badges, etc. can be compressed or removed to fit within available space within the decreased collective diameter of the first-level circular user interface object and the second-level circular user interface object. From 220, method 200 proceeds to 222.

At 222, a third-level circular user interface object with a third-level user interface object representing a third-level data object associated with a second-level data object is displayed. In some implementations, the third-level circular user interface object can be divided into at least one region where associated third-level user interface objects are displayed. In some implementations, a third-level user interface object can represent two or more third-level business objects. In some implementations, the third-level circular user interface object can have an inner circular edge and an outer circular edge. In some implementations, at least one third-level data object can be displayed within the area formed by the inner circular edge and the outer circular edge of the third-level circular user interface object. In some implementations, the inner circular edge of the third-level circular user interface object can be attached to an outer edge of the second-level circular user interface object. In some implementations, the collective diameter of the first-level circular user interface object the second-level circular user interface object and the third-level circular user interface object can correspond to what was previously the collective diameter of the first-level circular user interface object and the second-level circular user interface object. In some implementations, if no third-level data objects are associated with a selected second-level data object, the second-level circular user interface object and associated second-level user interface object is not displayed. In this case, an indication may be made to the user that there are no third-level data objects associated with the selected second-level data object. The indication may be similar to that as described above with regard to a selected first-level user interface object with no associated second-level data objects. A prompt to open or access the second-level data object, if applicable, may then be generated. In other implementations, the third-level circular user interface object may be displayed in an empty and non-selectable state. In some implementations, selecting another first-level user interface object or second-level user interface object can reset the selection indication of the selected another first-level user interface object and/or another second-level user interface object. In these implementations, a new second-level circular user interface object and/or a new third-level circular user interface object associated with the selected another first-level user interface object or another second-level user interface object may be displayed. The third-level circular user interface object and third-level user interface object may be displayed differently to indicate their difference, relative importance, relative size of their particular contents, order of access, date of creation, date of modification, security access level necessary to access, relative value, or any other suitable distinguishing characteristic, value and/or attribute. Displaying differently may mean, for example, different colors, sizes, shapes, or any other suitable indicator. After 222, method 200 stops.

While the disclosure describes a concentric hierarchical list browser in terms of displaying three levels, the concentric hierarchical list browser is not limited to display only three levels. Those of ordinary skill will recognize that the concentric hierarchical list browser may display a multitude of levels.

Figure 3A:
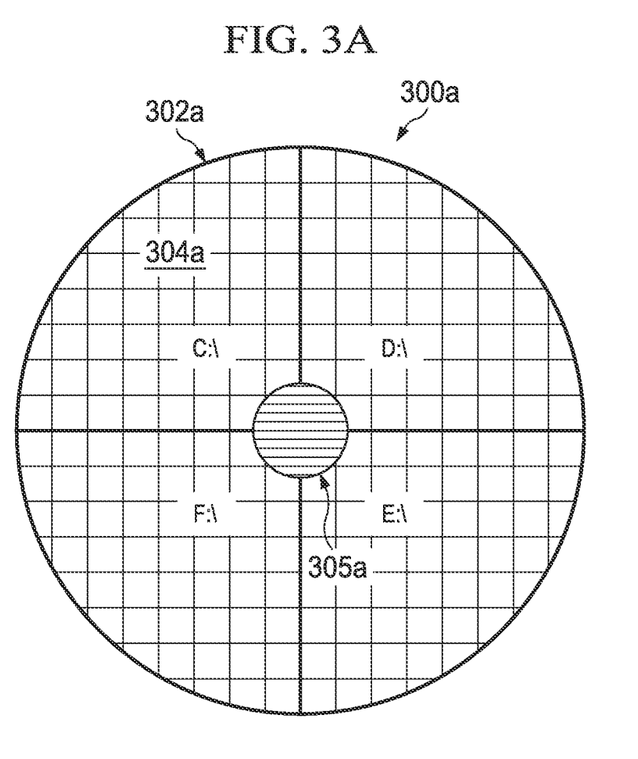
FIGS. 3A-3C illustrate example implementations of a concentric hierarchical list browser.

Referring now to FIG. 3A, FIG. 3A illustrates an example first-level circular user interface object 302a. A first-level user interface object 304a is shown representing a first-level data object (i.e., disk drive C:\ of a set of physical and/or virtual disk drives). Also shown are other first-level user interface objects for disk drives D:\, E:\, and F:\. While the first-level user interface object 304a is illustrated to be in a wedge or pie shape and part of a clockwise oriented progression of represented first-level data objects, a shape of the first-level user interface object 304a may be in any suitable shape and the orientation/placement of first-level user interface object 304a may be in any suitable orientation/placement. In some implementations, the shape of the first-level user interface object 304a can be adjusted. In some implementations, the placement of the first-level user interface object 304a can be adjusted. In some implementations, the shape or placement adjustment can be performed automatically or manually to indicate difference, relative importance, relative size of particular contents, order of access, date of creation, date of modification, security access level necessary to access, relative value, or any other suitable distinguishing characteristic, value and/or attribute.

In some implementations, a first-level circular user interface object 302a can be rotated. In these implementations, a first-level user interface object 304a (and other associated first-level user interface objects) may be rotated with the first-level circular user interface object 302a. For example, rotation of the first-level circular user interface object 302a may be performed by selecting the first-level user interface object 304a with a mouse pointer, gesture, stylus, or any suitable selection method and dragging the first-level user interface object 304a around on the display. In this implementation, the first-level circular user interface object 302a and associated first-level user interface objects would rotate.

One of ordinary skill will recognize that other user interface devices and methods could also be used to provide rotation functionality.

In some implementations, a first-level circular user interface object 302a can be resized. Resizing may be performed by, for example, selecting, clicking, multi-clicking, dragging, gestures, multi-touch, pinching, an algorithm, voice control, and any other suitable resizing method or operation. In these implementations, a first-level user interface object 304a (and other associated first-level user interface objects) may be resized to fit within the decreased-diameter first-level circular user interface object 302a.

FIG. 3A also illustrates a default state user interface object 305a situated in the middle of the first-level circular user interface object 302a. In some implementations the default state user interface object 305a can be situated at any location internal or external to a concentric hierarchical list browser. In some implementations, selecting the default state user interface object 305a can perform a back and/or undo function as understood by one of ordinary skill.

Figure 3B:
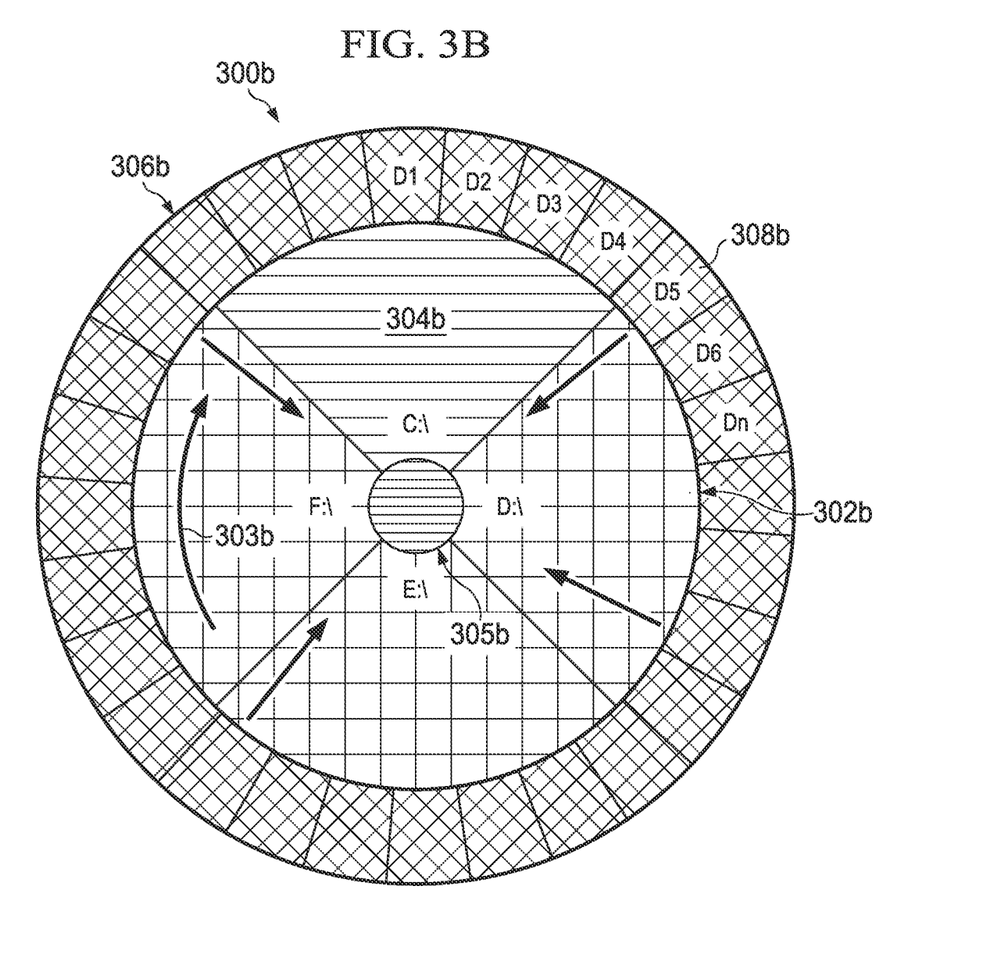

Referring now to FIG. 3B, FIG. 3B illustrates a second-level circular user interface object 306b attached to a first-level circular user interface object 302b following the selection of a first-level user interface object 304b. The first-level user interface object 304b is shown selected by different shading. The first-level circular user interface object 302b is also shown automatically rotated 303b to orient the first-level user interface object 304b to the upper portion of the first-level circular user interface object 302b. Also, shown is a decrease in the diameter of the first-level circular user interface object 302b following the selection of the first-level user interface object 304b and a decrease in the sizes of the first-level user interface object 304b (and other associated first-level user interface objects) to fit within the decreased-diameter first-level circular user interface object 302b.

A second-level user interface object 308b representing a second-level data object (e.g., a directory D5) is shown. While the second-level user interface object 308b is illustrated to be in a wedge-type shape and part of a clockwise oriented progression of represented second-level data objects (i.e., directories D1-Dn), a shape of the second-level user interface object 308b may be any suitable shape and the orientation/placement of the second-level user interface object 308b may be in any suitable orientation/placement. In some implementations, the shape of the second-level user interface object 308b may be adjusted. In some implementations, the placement of the second-level user interface object 308b can be adjusted. In some implementations, the shape or placement adjustment can be performed automatically or manually to indicate difference, relative importance, relative size of particular contents, order of access, date of creation, date of modification, security access level necessary to access, relative value, or any other suitable distinguishing characteristic, value and/or attribute.

In some implementations, a second-level circular user interface object 306b can be rotated independently of an attached first-level circular user interface object 302b. In other implementations, rotation of the first-level circular user interface object 302b or the second-level circular user interface object 306b rotates any other attached circular user interface object.

In some implementations, a collective diameter of a first-level circular user interface object 302b and a second-level circular user interface object 306b can be resized. Resizing may be performed as described above with regard to the resizing of the first-level circular user interface object 302b. In these implementations, a first-level user interface object 304b (and other associated first-level user interface objects) and a second-level user interface object 306b (and other associated second-level user interface objects) may be resized to fit within a decreased collective diameter of the first-level circular user interface object 302b and the second-level circular user interface object 306b.

FIG. 3B also illustrates a default state user interface object 305b situated in the middle of the first-level circular user interface object 302b. In some implementations, selecting the default state user interface object 305b can perform a back and/or undo function as understood by one of ordinary skill. For example, a selection of the default state user interface object 305b can revert the concentric hierarchical list browser as illustrated in FIG. 3B back to the concentric hierarchical list browser state as illustrated in FIG. 3A or to some other intermediate state.

Figure 3C:
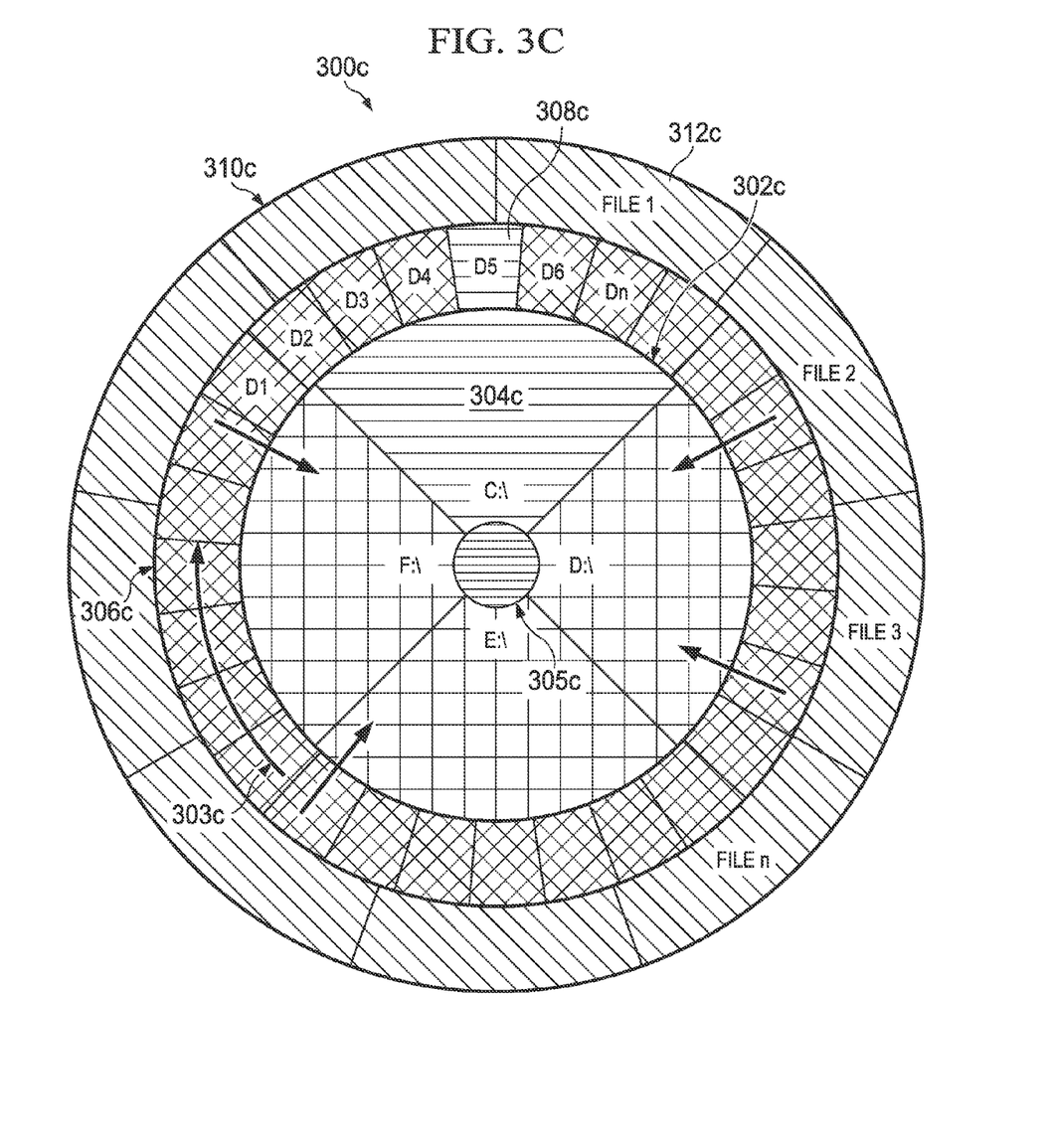

Referring now to FIG. 3C, FIG. 3C illustrates a third-level circular user interface object 310c attached to a combined first-level circular user interface object 302c and second-level circular user interface object 306c following a selection of a second-level user interface object 308c. The second-level user interface object 308c is shown selected by different shading. The second-level circular user interface object 306c is also shown automatically rotated 303c to orient the second-level user interface object 308c to be aligned on a circular angle with a selected first-level user interface object 304c. Also shown is a decrease in the collective diameter of the first-level circular user interface object 302c and the second-level circular user interface object 306c following the selection of the second-level user interface object 308c and a decrease in the sizes of a first-level user interface object 304c (and other associated first-level user interface objects) and the second-level user interface object 308c (and other associated second-level user interface objects) to fit within the decreased-diameter first-level circular user interface object 302c and the second-level circular user interface object 306c.

A third-level user interface object 312c representing a third-level data object (e.g., a file, FILE 1) is shown. While the third-level user interface object 312c is illustrated to be in a wedge-type shape and part of a clockwise oriented progression of represented third-level data objects (i.e., files FILE 1-FILE n), a shape of the third-level user interface object 312c may be any suitable shape and the orientation/placement of the third-level user interface object 312c may be in any suitable orientation/placement. In some implementations, the shape of the third-level user interface object 312c can be adjusted. In some implementations, the placement of the third-level user interface object 312c can be adjusted. In some implementations, the shape or placement adjustment can be performed automatically or manually to indicate difference, relative importance, relative size of particular contents, order of access, date of creation, date of modification, security access level necessary to access, relative value, or any other suitable distinguishing characteristic, value and/or attribute.

In some implementations, a third-level circular user interface object 306c can be rotated independently of an attached first-level circular user interface object 302c and second-level circular user interface object 306c. In other implementations, rotation of the first-level circular user interface object 302c, the second-level circular user interface object 306c, or the third-level circular user interface object 310c rotates any other attached circular user interface object.

In some implementations, a collective diameter of a first-level circular user interface object 302c, a second-level circular user interface object 306c, and a third-level circular user interface object 310c can be resized. Resizing may be performed as described above with regard to the resizing of the first-level circular user interface object 302c. In these implementations, a first-level user interface object 304c (and other associated first-level user interface objects), a second-level user interface object 306c (and other associated second-level user interface objects), and a third-level user interface object 310c (and other associated third-level user interface objects) may be resized to fit within a decreased collective diameter of the first-level circular user interface object 302c, the second-level circular user interface object 306c, and the third-level user interface object 310c.

FIG. 3C also illustrates a default state user interface object 305c situated in the middle of the first-level circular user interface object 302c. In some implementations, selecting the default state user interface object 305c can perform a back and/or undo function as understood by one of ordinary skill. For example, a selection of the default state user interface object 305c can revert the concentric hierarchical list browser as illustrated in FIG. 3C back to the concentric hierarchical list browser state as illustrated in FIG. 3B, FIG. 3A, or to some other intermediate state.

Figure 4:
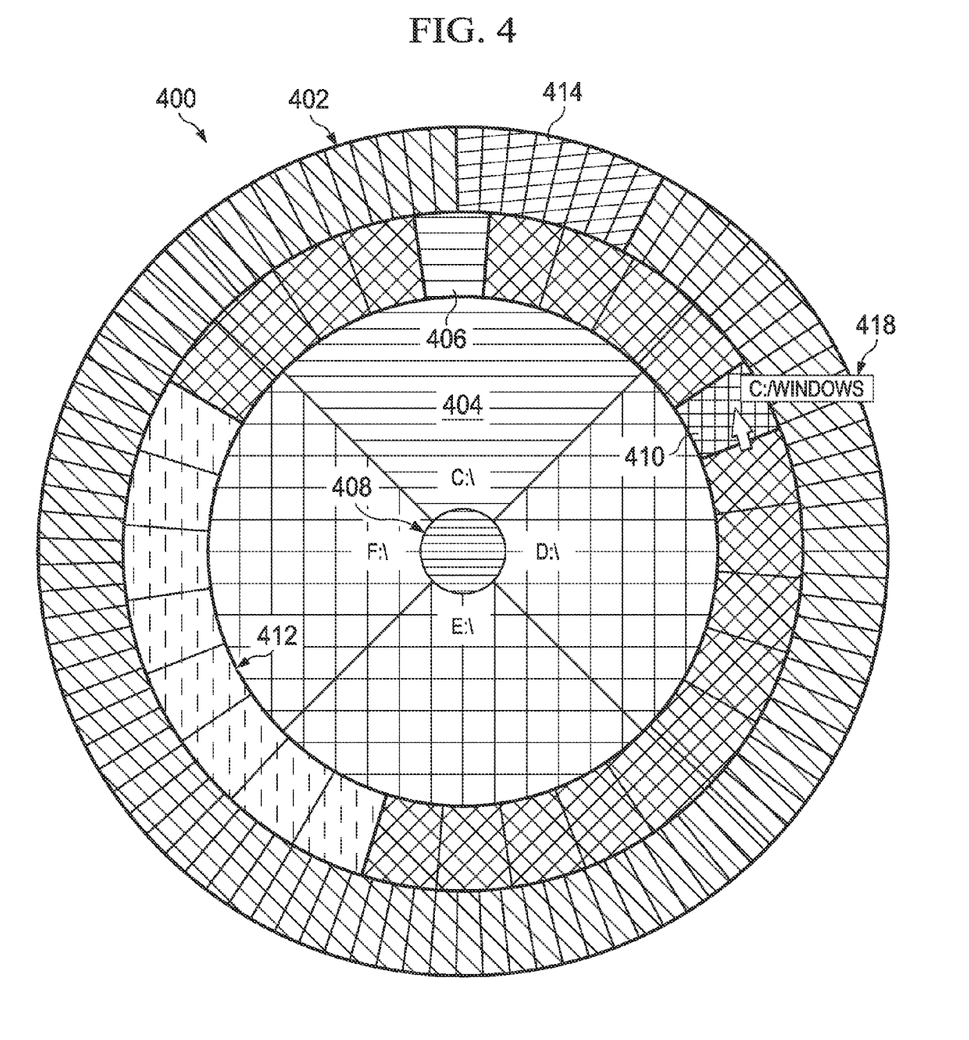
FIG. 4 illustrates an example implementation of a concentric hierarchical list browser.

Referring now to FIG. 4, FIG. 4 illustrates a three-level circular user interface 402 (shown enlarged for detail) generated as a result of the selection of first-level user interface object 404 and second-level user interface object 406. A default state user interface object 408 is shown situated in the middle of a first-level circular user interface object and operates as previously described with respect to FIGS. 3A-3C.

In some implementations, user interface objects can be displayed differently to indicate their difference, relative importance, relative size of their particular contents, order of access, date of creation, date of modification, security access level necessary to access, relative value, or any other suitable distinguishing characteristic, value and/or attribute. Displaying differently may mean, for example, different colors, sizes, shapes, graphical effect (e.g., shadow, bevel, etc.), or any other suitable indicator. For example, second-level user interface objects 410 and 412 are displayed differently to indicate a directory and files, respectively. For example, first-level user interface objects representing a set of physical and/or virtual disk drives may each be displayed differently depending on whether the drives are physical or virtual, local or network, etc. Likewise, in some implementations, empty directories can be readily identifiable by how the empty directories are displayed (e.g., specific color, graphical effect, etc.). In some implementations, empty directories can also not be selectable. Likewise, third-level user interface objects 414 are shown differently than other third-level user interface objects because they are of a different data object type.

In some implementations, a user interface object can be selected and an associated layer circular user interface object scrolled. In these implementations, an identifier for the data object associated with the currently selected user interface object may be displayed as the associated layer circular user interface object is scrolled to quickly identify a data object. For example, a computer mouse could be used to select the user interface object and a mouse wheel used to scroll the associated layer circular user interface object. In another implementation, gesture-based actions may be used to perform scrolling. One of ordinary skill will recognize that other user interface devices and methods could also be used to provide scrolling functionality.

In some implementations, a user interface object can be selected and/or hovered over to provide additional information about the data object associated with the user interface object. For example, FIG. 4 illustrates a standard mouse pointer hovering over second-level user interface object 410 and additional information 418 associated with second-level user interface object 410 displayed. The additional information may be provided by a thumbnail, exploded view, text, badge, audio, video, and/or any other suitable information conveying method.

In some implementations, a general reset of the entire circular user interface may be performed after a predetermined period of time, a predetermined period of time with no activity, a response to a request to clear the circular user interface via a user interface object, or other suitable indication, flag, algorithm, etc. One of ordinary skill will recognize other methods to perform the general reset.

In some implementations, selection of a user interface object may not result in a reduction of the diameter of the associated circular user interface object or associated sub-layer circular user interface objects. In other implementations, individual circular user interface objects may have their diameters reduced while other layer circular user interface objects remain the same size.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for browsing hierarchically structured data, comprising:
   displaying, using at least one hardware processor, a first-level circular user interface object with at least one first-level user interface object representing a first-level data object, wherein the first-level circular user interface object has an outer circular edge and is of an initial size; and
   responsive to receiving an indication of a selection of the at least one first-level user interface object:
      automatically rotating the first-level circular user interface object to orient the at least one first-level user interface object to stop at a predefined orientation used to align all selected user interface objects on the same circular angle;
      indicating the selection of the at least one first-level user interface object;
      decreasing the diameter of the first-level circular interface component; and
      displaying in a second-level circular user interface object at least one second-level user interface object representing a second-level data object associated with the first-level data object, wherein the second-level circular user interface object has an inner circular edge and an outer circular edge, and wherein the inner circular edge of the second-level circular user interface object is attached to the outer circular edge of the first-level circular user interface object.

2. The computer-implemented method of claim 1, further comprising:
responsive to receiving an indication of a selection of the at least one second-level user interface object:
automatically rotating the second-level circular user interface object to orient the at least one second-level user interface object to stop at the predefined orientation;
indicating selection of the at least one second-level user interface object;
decreasing the collective diameter of the first-level circular user interface object and the second-level circular user interface object; and
displaying in a third-level circular user interface object at least one third-level user interface object representing a third-level data object associated with the second-level data object, wherein the third-level circular user interface object has an inner circular edge and an outer circular edge, and wherein the inner circular edge of the third-level circular user interface object is attached to the outer circular edge of the second-level circular user interface object.

3. The computer-implemented method of claim 2, wherein selecting is performed using at least one of a computer mouse, keyboard, stylus, touch screen, an algorithm, and voice recognition.

4. The computer-implemented method of claim 1, further comprising resizing the collective diameter of the first-level circular user interface object and the second-level circular user interface object.

5. The computer-implemented method of claim 4, wherein the resizing is performed by at least one of selecting, clicking, multi-clicking, dragging, multi-touch, pinching, an algorithm, and voice control.

6. The computer-implemented method of claim 1, further comprising displaying, in the first-level circular user interface object, a fourth user interface object.

7. The computer-implemented method of claim 6, wherein the fourth user interface object performs an undo function when selected.

8. The computer-implemented method of claim 2, wherein each of the first-level circular user interface object, the second-level circular user interface object, and the third-level circular user interface object may be rotated independently.

9. The computer-implemented method of claim 1, wherein the collective diameter of the first-level circular user interface object and the second-level circular user interface object equals the initial size.

10. The computer-implemented method of claim 2, wherein the collective diameter of the first-level circular user interface object, the second-level circular user interface object, and third-level circular user interface object equals the initial size.

11. A computer-program product for browsing hierarchically structured data, the computer program product comprising computer-readable instructions embodied on tangible, non-transitory media, the instructions operable when executed to:
display, using at least one hardware processor, a first-level circular user interface object with at least one first-level user interface object representing a first-level data object, wherein the first-level circular user interface object has an outer circular edge and is of an initial size; and responsive to receiving an indication of a selection of the at least one first-level user interface object:
automatically rotating the first-level circular user interface object to orient the at least one first-level user interface object to stop at a predefined orientation used to align all selected user interface objects on the same circular angle;
indicate the selection of the at least one first-level user interface object;
decrease the diameter of the first-level circular interface component; and
display in a second-level circular user interface object at least one second-level user interface object representing a second-level data object associated with the first-level data object, wherein the second-level circular user interface object has an inner circular edge and an outer circular edge, and wherein the inner circular edge of the second-level circular user interface object is attached to the outer circular edge of the first-level circular user interface object.

12. The computer-program product of claim 11, further comprising:
responsive to receiving an indication of a selection of the at least one second-level user interface object:
automatically rotating the second-level circular user interface object to orient the at least one second-level user interface object to stop at the predefined orientation;
indicate the selection of the at least one second-level user interface object;
decrease the collective diameter of the first-level circular user interface object and the second-level circular user interface object; and
display in a third-level circular user interface object at least one third-level user interface object representing a third-level data object associated with the second-level data object, wherein the third-level circular user interface object has an inner circular edge and an outer circular edge, and wherein the inner circular edge of the third-level circular user interface object is attached to the outer circular edge of the second-level circular user interface object.

13. The computer-program product of claim 11, the instructions further operable when executed to resize the collective diameter of the first-level circular user interface object and the second-level circular user interface object.

14. The computer-program product of claim 12, wherein each of the first-level circular user interface object, the second-level circular user interface object, and the third-level circular user interface object may be rotated independently.

15. The computer-program product of claim 11, wherein the collective diameter of the first-level circular user interface object and the second-level circular user interface object equals the initial size.

16. The computer-program product of claim 12, wherein the collective diameter of the first-level circular user interface object, the second-level circular user interface object, and third-level circular user interface object equals the initial size.

17. A system for browsing hierarchically structured data, comprising:
memory operable to store at least one file system; and
at least one hardware processor interoperable coupled to the memory and operable to:
display a first-level circular user interface object with at least one first-level user interface object representing a first-level data object, wherein the first-level circular user interface object has an outer circular edge and is of an initial size; and responsive to receiving an indication of a selection of the at least one first-level user interface object:

automatically rotating the first-level circular user interface object to orient the at least one first-level user interface object to stop at a predefined orientation used to align all selected user interface objects on the same circular angle;

indicate the selection of the at least one first-level user interface object;

decrease the diameter of the first-level circular interface component; and display in a second-level circular user interface object at least one second-level user interface object representing a second-level data object associated with the first-level data object, wherein the second-level circular user interface object has an inner circular edge and an outer circular edge, and wherein the inner circular edge of the second-level circular user interface object is attached to the outer circular edge of the first-level circular user interface object.

18. The system of claim 17, further comprising:

responsive to receiving an indication of a selection of the at least one second-level user interface object:

automatically rotating the second-level circular user interface object to orient the at least one second-level user interface object to stop at the predefined orientation;

indicate the selection of the at least one second-level user interface object;

decrease the collective diameter of the first-level circular user interface object and the second-level circular user interface object; and display in a third-level circular user interface object at least one third-level user interface object representing a third-level data object associated with the second-level data object, wherein the third-level circular user interface object has an inner circular edge and an outer circular edge, and wherein the inner circular edge of the third-level circular user interface object is attached to the outer circular edge of the second-level circular user interface object.

19. The system of claim 17, the instructions further operable when executed to resize the collective diameter of the first-level circular user interface object and the second-level circular user interface object.

20. The system of claim 17, wherein the collective diameter of the first-level circular user interface object and the second-level circular user interface object equals the initial size.

* * * * *